Figure 1:
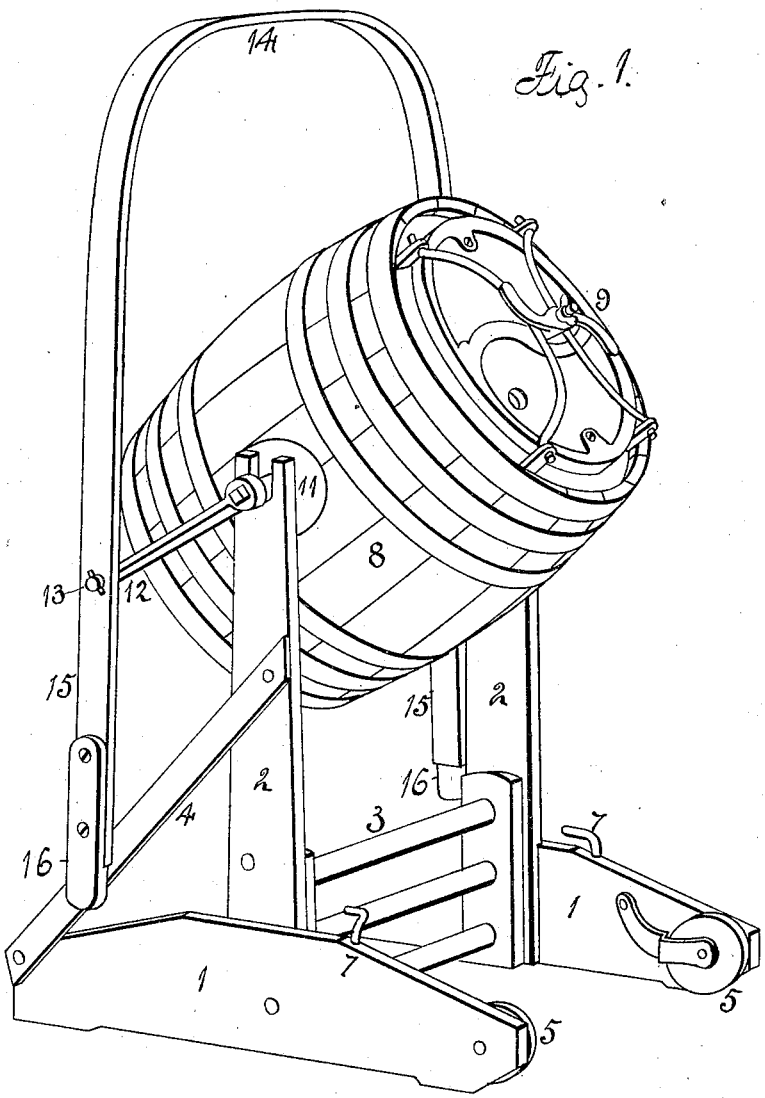

No. 684,566. Patented Oct. 15, 1901.
W. DOBSON.
CHURN.
(Application filed Jan. 31, 1901.)
(No Model.) 2 Sheets—Sheet 1.

Witnesses:
J. P. Taylor
J. E. O. Behel

Inventor:
William Dobson
By A. O. Behel
Atty

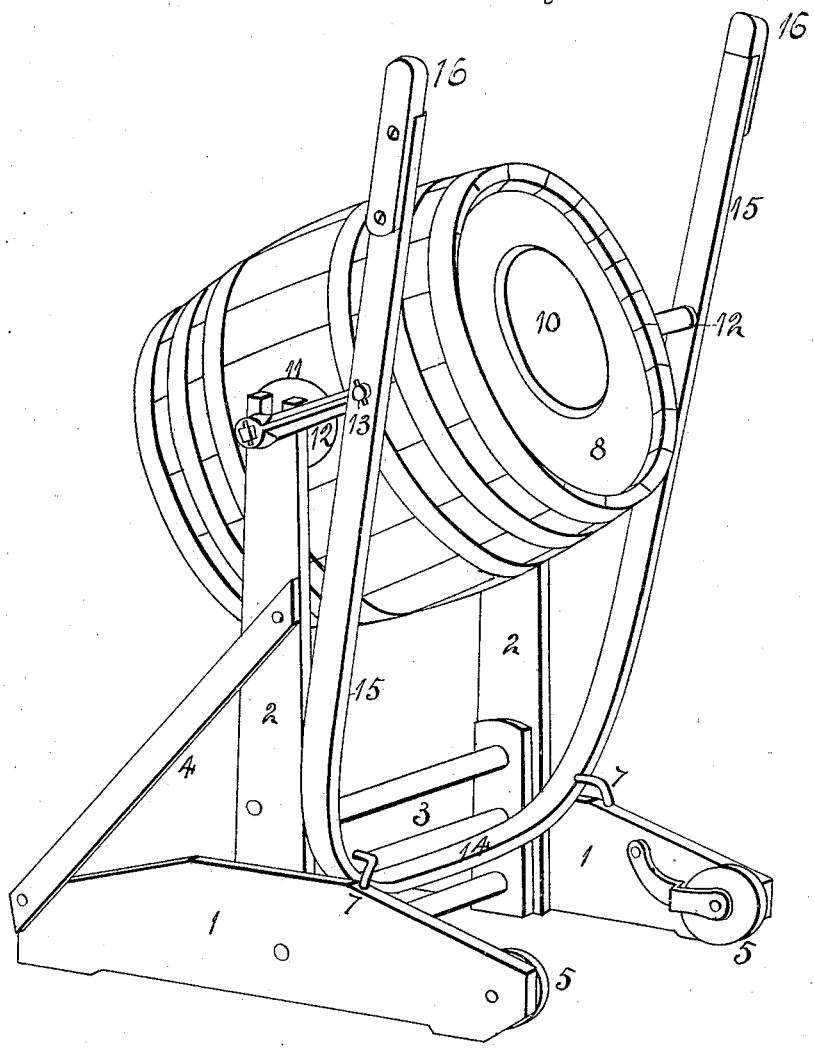

UNITED STATES PATENT OFFICE.

WILLIAM DOBSON, OF ROCKFORD, ILLINOIS.

CHURN.

SPECIFICATION forming part of Letters Patent No. 684,566, dated October 15, 1901.

Application filed January 31, 1901. Serial No. 45,529. (No model.)

*To all whom it may concern:*

Be it known that I, WILLIAM DOBSON, a citizen of the United States, residing at Rockford, in the county of Winnebago and State of Illinois, have invented certain new and useful Improvements in Churns, of which the following is a specification.

The object of this invention is to apply a bail to an ordinary revolving barrel-churn, by means of which it can be revolved from any position the operator chooses to take, and by inverting the bail a connection is formed with the main supporting-frame, and the ends of the bail form handles, by means of which the churn can be moved about upon wheels secured to the main frame.

In the accompanying drawings, Figure 1 is a perspective view of my improved churn, showing the bail in position for the operator to revolve it. Fig. 2 is a perspective view of the churn with the bail inverted.

The main frame consists of the horizontal feet 1, supporting two uprights 2 and connected by the cross-bars 3. A brace 4 connects one of the uprights with one of the feet. One end of each of the feet supports a roller 5, and a hook 7 extends from the upper face of each foot near the base of the uprights. The churn-body 8 is of the usual construction and has one end provided with a removable head 9, held in place by suitable means, and the other end of the churn-body has the usual counterbalance-weight 10. To opposite sides of the churn-body are secured stub-axles or trunnions 11, which are supported in the upper ends of the uprights 2 and upon which the body revolves. To each trunnion is connected a crank 12, and each crank has a stud 13 extending at right angles thereto. A bail of a width to receive the stud 13 of the crank has its end 14 a sufficient distance from the studs to permit the churn-body to revolve under it, and the arms 15 of the bail have weights 16 secured to their free ends. By means of the bail the churn-body can be revolved through the crank connection therewith and the operator can occupy almost any position, and when the bail is released it will assume a vertical position by reason of the weighted ends. By inverting the bail, as shown at Fig. 2, its end will rest against the hooks, and by taking hold of the weighted ends of the bail the supporting-frame may be tipped upon the wheels 5, when the churn can be moved about. By the employment of the bail children can operate the churn, as the bail can be swung into proper position for them to reach.

I claim as my invention—

1. A revolving churn having cranks secured thereto, a bail pivotally connected to the cranks, its ends extending beyond the cranks, and a weight secured to the end of each arm.

2. A revolving churn having cranks secured thereto, a frame for the churn, hooks secured to the frame, and a bail pivotally connected to the cranks.

WILLIAM DOBSON.

Witnesses:
A. O. BEHEL,
E. BEHEL.